(12) United States Patent
Thorsted

(10) Patent No.: US 9,294,689 B2
(45) Date of Patent: Mar. 22, 2016

(54) DIGITAL RUVIS CAMERA

(71) Applicant: Michael K. Thorsted, Spotsylvania, VA (US)

(72) Inventor: Michael K. Thorsted, Spotsylvania, VA (US)

(73) Assignee: Syntronics, LLC, Fredericksburg, VA (US)

( * ) Notice: Subject to any disclaimer, the term of this patent is extended or adjusted under 35 U.S.C. 154(b) by 0 days.

(21) Appl. No.: 14/518,078

(22) Filed: Oct. 20, 2014

(65) Prior Publication Data

US 2015/0097963 A1 Apr. 9, 2015

Related U.S. Application Data

(63) Continuation of application No. 14/070,328, filed on Nov. 1, 2013.

(60) Provisional application No. 61/721,667, filed on Nov. 2, 2012.

(51) Int. Cl.
*H04N 5/30* (2006.01)
*H04N 5/225* (2006.01)

(52) U.S. Cl.
CPC .............. *H04N 5/30* (2013.01); *H04N 5/2254* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 4,983,846 A | 1/1991 | Rios et al. | |
| 5,455,674 A | 10/1995 | Purcell | |
| 5,485,530 A | 1/1996 | Lakowicz et al. | |
| 6,392,238 B1 | 5/2002 | Vezard | |
| 6,636,701 B1 * | 10/2003 | Vezard et al. | 396/374 |
| 7,050,715 B1 | 5/2006 | Carrington et al. | |
| 7,186,990 B2 | 3/2007 | Powers et al. | |
| 7,368,722 B2 | 5/2008 | Berthold et al. | |
| 7,489,391 B2 | 2/2009 | Engheta et al. | |
| 7,545,969 B2 | 6/2009 | Bennett et al. | |
| 7,897,900 B2 | 3/2011 | Tafas | |
| 2002/0087085 A1 | 7/2002 | Dauga | |
| 2004/0021086 A1 | 2/2004 | Verrier et al. | |
| 2004/0099809 A1 | 5/2004 | Verrier et al. | |
| 2004/0119975 A1 | 6/2004 | Ostler et al. | |
| 2006/0133643 A1 * | 6/2006 | Bennett et al. | 382/100 |

(Continued)

OTHER PUBLICATIONS

Anonymous: "Color Filter Glass: Ultraviolet Imaging, Visible Absorbing Filter Data", Apr. 23, 2004, Retrieved from the Internet: URL: http://web.archive.org/web/200405010000*/http://www.hoyaoptics.com/color_filter/uv_transmitting.htm [retrieved on Feb. 13, 2015].*

*Primary Examiner* — James M Anderson, II
(74) *Attorney, Agent, or Firm* — Finnegan, Henderson, Farabow, Garrett & Dunner LLP

(57) ABSTRACT

An ultraviolet sensitive video camera is disclosed. The camera may have an input window and a bandpass filter. The input window may receive into the camera ultraviolet radiation reflected off of a subject. The bandpass filter may filter the ultraviolet radiation received into the camera through the input window. The bandpass filter may have a passband centered at about 254 nm and a bandwidth of about 1 nm to about 100 nm. The camera may also have an image sensor and at least one controller. The image sensor may collect the filtered ultraviolet radiation passing through the bandpass filter and generate an output based on the collected ultraviolet radiation. The at least one controller may be configured to generate video display signals based on the output of the image sensor.

20 Claims, 7 Drawing Sheets

(56) References Cited

U.S. PATENT DOCUMENTS

| | | | |
|---|---|---|---|
| 2008/0090182 A1* | 4/2008 | Suzuki et al. | 430/321 |
| 2009/0072142 A1* | 3/2009 | Blitzer | 250/338.1 |
| 2009/0102004 A1* | 4/2009 | Jao et al. | 257/434 |
| 2009/0118600 A1* | 5/2009 | Ortiz et al. | 600/306 |
| 2010/0025568 A1* | 2/2010 | Okuda et al. | 250/208.1 |
| 2011/0169962 A1* | 7/2011 | Gat et al. | 348/164 |
| 2012/0120232 A1* | 5/2012 | Nishikawa | 348/135 |
| 2013/0169860 A1* | 7/2013 | Yang | 348/370 |

\* cited by examiner

DIGITAL RUVIS CAMERA

RELATED APPLICATIONS

This application is a continuation of application Ser. No. 14/070,328, filed Nov. 1, 2013, which claims priority to U.S. Provisional Application No. 61/721,667, filed Nov. 2, 2012, both of which are incorporated herein by reference.

TECHNICAL FIELD

The present disclosure is directed to a digital camera and, more particularly, to a digital Reflected Ultraviolet Imaging System ("RUVIS") camera for detecting and analyzing forensic evidence.

BACKGROUND

Crime scene investigators are often challenged with a difficult task of detecting and analyzing forensic evidence that is not visible to the human eye, most notably fingerprints. To detect otherwise invisible forensic evidence, investigators have relied on light in the ultraviolet ("UV") spectrum, also known as UV radiation. While visible light has a wavelength ranging from about 400 nm to about 750 nm, UV radiation has a shorter wavelength ranging from about 10 nm to about 400 nm. Some types of forensic evidence may include organic substances (e.g., blood, saliva, and semen) that are either readily visible or, upon exposure to UV radiation, may fluoresce and become visible to the human eye. However, other substances like fingerprints have historically required dusting with a fluorescent dusting powder or dyeing prior to UV radiation exposure in order to make the fingerprints visible to the unaided eye. In certain situations, RUVIS technology, which enables a user to see latent fingerprints on nonporous surfaces prior to treatment with powders or dyes, may be used to examine latent fingerprints.

RUVIS technology works on the principle that most nonporous surfaces either reflect or absorb light in the UV spectrum. When UV radiation illuminates a nonporous surface containing a latent fingerprint, the fingerprint stands out as darker or lighter than the background based on whether the surface reflects or absorbs the UV radiation, respectively. Early RUVIS devices were portable, battery operated devices that used an image intensifier with a special photocathode to amplify the reflected UV radiation to allow an investigator to see latent fingerprints. The noisy, grainy, low-resolution, green image on these devices was good enough to detect latent fingerprints, but was inadequate to document and photograph the fingerprints. Attempts were made to capture images of latent fingerprints by including a video or digital camera with the image intensifier. However, these systems were limited by a field of view smaller than two inches by two inches and a relatively low-resolution of the image intensifier. These systems also required collecting and processing of an image before a user could determine whether a suitable latent fingerprint had been captured.

Despite these limitations in RUVIS systems, the forensics community has recently set 1000 pixels per square inch as the minimum resolution to capture latent fingerprints. While modern digital cameras are capable of 12, 14, and 16 megapixel resolutions or even higher, they cannot capture images in the UV spectrum. In fact, to prevent images in the visible spectrum from appearing blurred, modern digital cameras are designed to have spectral sensitivity similar to a human eye, thereby blocking light from the UV spectrum. Glass is used in the lens and window of the sensor for most modern digital cameras, which blocks over ninety percent of the light below 300 nm and most of the light between 300 and 400 nm. Additionally, bandpass filters are often used to block light outside of the visible spectrum, further preventing modern digital cameras from capturing high resolution images in the UV spectrum.

SUMMARY

In one aspect, the disclosure is directed toward a UV sensitive video camera. The camera may include an input window and a bandpass filter. The input window may receive into the camera UV radiation reflected off of a subject. The bandpass filter may filter the UV radiation received into the camera through the input window. The bandpass filter may have a passband centered at about 254 nm and a bandwidth of about 1 nm to about 100 nm. The camera may also include an image sensor for collecting the filtered UV radiation passing through the bandpass filter and for generating an output based on the collected UV radiation. The camera may further include at least one controller configured to generate video display signals based on the output of the image sensor.

In another aspect, the disclosure is directed toward a method for capturing UV images on a camera. The method may include illuminating a subject with a UV lamp and receiving, on a camera, UV radiation reflecting off of the subject from the ultraviolet lamp. The method may also include filtering the UV radiation entering the camera with a filter having a passband centered at about 254 nm and a bandwidth of about 1 nm to about 100 nm. The method may further include collecting the filtered UV radiation and controlling, by at least one controller, gain and integration time of the camera to digitally capture images corresponding to the collected UV radiation. The method may also include generating a video display of the digitally captured images showing the subject illuminated by UV radiation and storing the digitally captured images.

DETAILED DESCRIPTION

Figure 1:
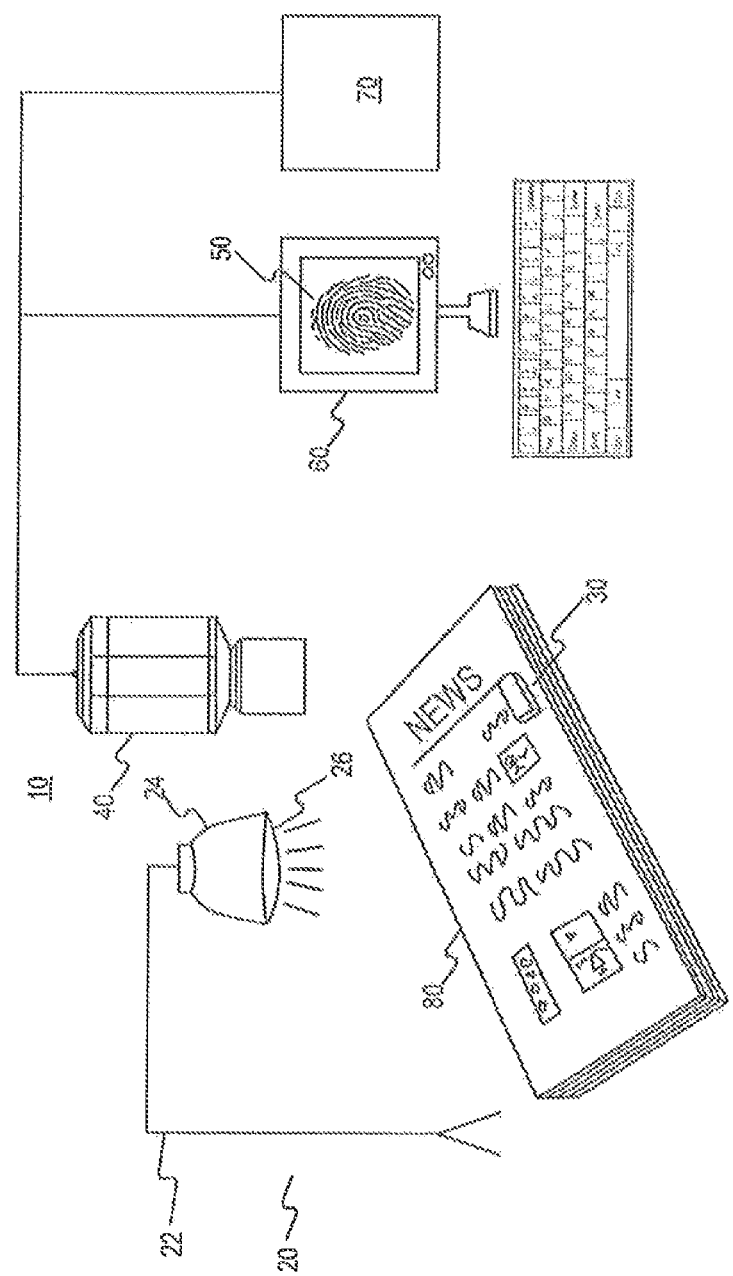
FIG. 1 is a diagrammatic illustration of an exemplary disclosed system for capturing UV images.

FIG. 1 illustrates an ultraviolet ("UV") imaging system 10 having a UV lamp 20 configured to direct UV radiation towards a subject 30. Imaging system 10 may also include a UV sensitive camera 40 configured to capture one or more UV images 50 of subject 30, a display 60 to view UV images 50 captured by camera 40, and a storage device 70 for storing captured UV images 50. UV imaging system 10 may be used in a lab (as shown), on location at a crime scene, or at any location having forensic evidence. In one embodiment, UV imaging system 10 may be a stationary system such that forensic evidence, i.e., subject 30, may be transported to UV imaging system 10 for analysis. However, it is contemplated that UV imaging system 10 may be transportable to subject 30.

For purposes of this disclosure, UV lamp 20 is depicted as a stationary mercury lamp. One skilled in the art will recognize, however, that UV lamp 20 may include any other type of UV light emitting device such as, for example, a deuterium light, a black light tube or bulb, a short wave UV lamp, a UV light-emitting diode, a UV laser, or a UV LED light. In one embodiment, UV lamp 20 may be configured to emit UV radiation at least at a wavelength of 254 nm at a power rating between one and 50 watts depending on the size of subject 30 and distance from subject 30. It is contemplated that UV lamp 20 may be configured to emit UV radiation continuously or in pulses. In the illustrated embodiment, UV lamp 20 is a standalone lamp that includes a stand 22, a housing 24 connected to and supported by stand 22, and a bulb 26 housed in housing 24. However, it is contemplated that UV lamp 20 may be connectable to camera 40 via an adjustable or fixed connecting member (not shown). Stand 22 may be configured to fixedly position UV lamp 20 to emit UV radiation towards subject 30 at a specific angle such as, for example, looking down roughly perpendicular to the surface of subject 30 (as shown) or from the side roughly parallel to the surface of subject 30. Alternatively, stand 22 may be adjustable such that UV lamp 20 may be positioned to emit UV radiation towards subject at a variety of angles so as to form an angle between the light emitted by UV lamp 20 and the surface of subject 30 between about zero to 180 degrees. It is contemplated that stand 22 may be bendable and connectable to housing 24 such that housing 24 and bulb 26 may be rotatable in the x, y, and z planes. UV lamp 20 may be connectable to an independent power source (not shown) via, for example, a 110 volt wall plug, or may include an internal battery (not shown) to power bulb 26. Alternatively, UV lamp 20 may be connectable to a laptop computer used for display 60 and powered via the laptop computer.

As UV radiation from UV lamp 20 contacts subject 30, the UV radiation may be either reflected or absorbed by nonporous surface 80 containing subject 30. In the illustrated embodiment, subject 30 may include a latent fingerprint that remained after a human hand contacted nonporous surface 80. However, it is contemplated that subject 30 may be any type of forensic evidence and may vary in size such as, for example, a portion of a single fingerprint or multiple fingerprints and palm prints. Subject 30 may include fresh or aged forensic evidence. It is contemplated that subject 30 may include multiple layers of forensic evidence overlaying one another. Nonporous surface 80 may include any surface that is capable of containing subject 30, such as, for example, a newspaper (as shown), playing cards, or money. It is contemplated that nonporous surface 80 may include flat or curved surfaces, such as, for example, a soda can, capable of containing subject 30.

After subject 30 is exposed to UV radiation from UV lamp 20, camera 40 may capture UV images 50. In the illustrated embodiment, camera 40 is positioned looking down on subject 30 at an angle roughly perpendicular to nonporous surface 80. However, it is contemplated that camera 40 may be positioned at a range of angles in connection with nonporous surface 80. Camera 40 may be held by a user (not shown) or fixedly or adjustably positioned by an overhead stand (not shown) or tripod (not shown). In one embodiment, the angle at which camera 40 views subject 30 may be adjustable. As shown in FIG. 1, connectable to display 60 and storage 70 to receive power. Alternatively, it is contemplated that camera 40 may be connectable to an independent power source (not shown) via, for example, a 110 volt wall plug, or may include an internal battery (not shown) to power camera 40. It is contemplated that camera 40 may receive direct or alternating current. Camera 40 may be in communication with display 60 and storage 70 via a wired connection or remotely over a wireless network (not shown).

Display 60 may be configured to receive UV images 50 from camera 40 as shown. In one embodiment, display 60 may include a monitor of a desktop computer or laptop computer. However, it is contemplated that display 60 may include any device configured to display video images, such as, for example, a camera display, a cellular phone display, or a television, etc. Display 60 may vary in size based on the type of device and the image quality preferred. Based on the type of device, display 60 may be mobile or stationary. For instance, a laptop computer or cellular phone may be transportable to a crime scene whereas a stationary desktop computer may remain in a lab. Display 60 may be in communication with camera 40 and storage device 70, and configured to send displayed UV images 50 to storage device 70 via, for example, a wired connection or remotely over a wireless network (not shown). It is contemplated that a computer associated with display 60 may be equipped with controls such as, for example, a keyboard, mouse, or touch screen. In such an embodiment, the computer may be configured to control the functions of camera 40, including, for example, capturing UV images 50 and sending UV images 50 to display 60 and storage device 70. In another embodiment, the computer may be configured to control the functions of display 60, including, for example, selecting which UV images 50 to display and sending UV images 50 to storage device 70. In yet another embodiment, the computer may be configured to control the functions of storage device 70, including, for example, selecting a filename and storage location for UV images 50.

Storage device 70 may include an external hard drive of a computer as shown. However, it is contemplated that storage device 70 may be any device configured to digitally store UV images 50, such as, for example, internal computer memory, internal camera memory, a removable memory device, or a writable disc. Depending on the type of device, storage device 70 may be mobile or stationary. For instance, internal camera memory may be transportable with camera 40 to a crime scene, whereas an external hard drive may remain stationary in a lab. Storage device 70 may be in communication with camera 40 and display 60 via, for example, a wired connection or remotely over a wireless network (not shown).

Figure 2:
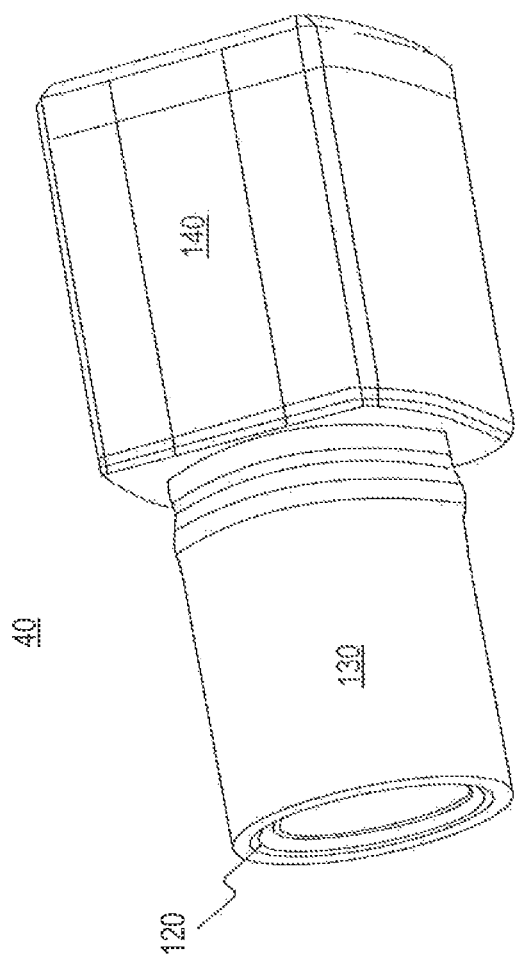
FIG. 2 is a pictorial illustration of an exemplary disclosed UV sensitive video camera that may be used in the system of FIG. 1.
Figure 3:
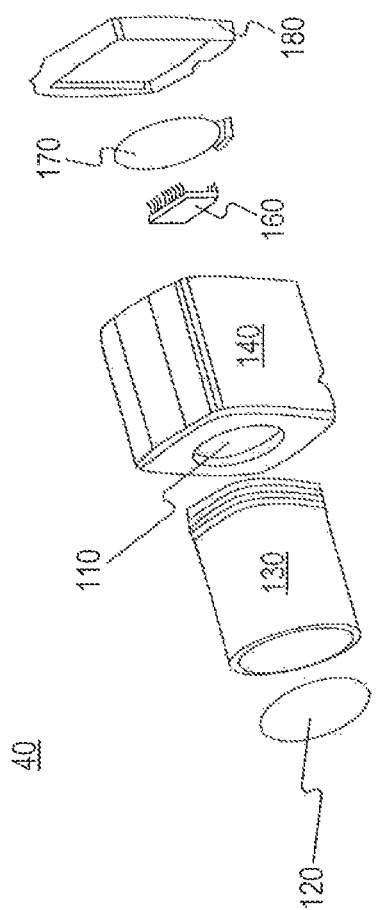
FIG. 3 is an assembly illustration of an exemplary disclosed UV sensitive video camera shown in FIG. 2.

As shown in FIGS. 2 and 3, camera 40 may include an input window 110 configured to receive UV radiation reflecting off of subject 30 into camera 40. Camera 40 may also include a bandpass filter 120 configured to filter UV radiation received into camera 40 through input window 110, a lens 130 configured to receive and pass at least a portion of the UV radiation received into camera 40 through input window 110, and a body 140 configured to collect the filtered UV radiation and generate a video display of UV images 50.

In one embodiment, input window 110 may include a viewing hole roughly the same diameter as lens 130 that is configured to allow at least a portion of UV radiation passing through bandpass filter 120 and lens 130 into camera body 140. It is contemplated that input window may be a circular viewing hole. Depending on the amount of light a user desires to enter camera body 140 and based on the thickness of bandpass filter 120 and lens 130, input window 110 may vary in diameter. It is contemplated that input window 110 may include a coverplate (not shown) that may occupy the viewing hole. In one embodiment, the coverplate may be constructed from various grades of fused silica, such as, for example, quartz, supracil, infracil, optosil, and other trade names. In another embodiment, the coverplate may be constructed from calcium fluoride, magnesium fluoride, sapphire, plastics, or other suitable materials configured to pass light having a wavelength of about 254 nm. In yet another embodiment, input window 110 may be configured without a coverplate.

Configured to filter UV radiation entering the camera through input window 110, bandpass filter 120 may be positioned along the optical path adjacent to lens 130 opposite input window 110. Alternatively, in another embodiment, bandpass filter 120 may be positioned along the optical path between lens 130 and input window 110. Bandpass filter 120 may be cylindrical or circular in shape. The diameter of bandpass filter 120 may vary depending on the size of input window 110 and lens 130, and the desired UV images 50. For purposes of this disclosure, bandpass filter 120 may have roughly the same diameter as lens 130. In one embodiment, bandpass filter 120 may have a passband centered at about 254 nm. However, it is contemplated that bandpass filter 120 may have a passband centered at other wavelengths depending upon the type of forensic evidence being captured. For instance, bandpass filter 120 may have a bandpass centered at about 450 nm to analyze biological fluids, at about 532 nm to analyze laser illuminated surfaces, and at about 695 or 800 nm to analyze document alteration. Bandpass filter 120 may have a bandwidth of about 1 nm to about 100 nm. In one embodiment, bandpass filter 120 may have a bandwidth of about 25 nm, which allows for about 25 percent transmission. In yet another embodiment, bandpass filter 120 may have a bandwidth of about 40 nm, which allows for about 33 percent transmission. It is contemplated that bandpass filter 120 may be configured to attenuate all out of band light by at least three orders of magnitude, having an out of band transmission of less than 0.1 percent. In another embodiment, bandpass filter 120 may be configured to attenuate approximately the entire visible and infrared spectrums to allow for clearer UV images 50.

Lens 130 may be positioned along the optical path between bandpass filter 120 and input window 110. In another embodiment, lens 130 may be positioned along the optical path adjacent bandpass filter 120 and opposite input window 110. However, it is contemplated that lens 130 may be omitted from camera 40. Lens 130 may be cylindrical in shape and vary in diameter based on the size of input window 110 and bandpass filter 120 and/or based on the size of the desired UV images 50. For purposes of this disclosure, lens 130 may be the same diameter as bandpass filter 120. In one embodiment, lens 130 may be constructed from various grades of fused silica, including quartz, supracil, utrasil, optosil, and other trade names. In another embodiment, lens 130 may be constructed from calcium fluoride, magnesium fluoride, sapphire, plastics, or other suitable materials configured to pass light having a bandwidth of about 254 nm. Depending on the construction material, lens 130 may be configured to block light at certain wavelengths. In one embodiment, lens 130 may include a quartz lens configured to pass about 90 percent of light at a wavelength of 254 nm and between 82 percent and 95 percent of light having a wavelength between 200 nm and 1100 nm.

For purposes of this disclosure, body 140 may be box-like in shape and input window 110 may be formed within body 140. Alternatively, body 140 may take on any shape used for modern digital cameras. Body 140 may be connectable to bandpass filter 120 or lens 130 such that an optical path is provided through bandpass filter 120, lens 130, and input window 110. In one embodiment, body 140 may be constructed out of plastic. However, body 140 may be constructed from other materials used in modern digital cameras, such as, for example, wood, aluminum, steel, and titanium.

FIG. 3 shows an assembly view of a disclosed embodiment of camera 40, including the contents housed in body 140. Body 140 may house an image sensor 160 configured to receive UV radiation entering body 140 and produce an electrical output, image capture electronics 170 configured to receive an electrical output from image sensor 160 and generate video display signals, and rear cover 180.

Image sensor 160 may be positioned within body 140 such that when light enters camera 40 through input window 110, it first contacts image sensor 160. For purposes of this disclosure, image sensor 160 may have a shape that matches the shape and size of body 140 such that image sensor 160 may be housed within body 140. It is contemplated that image sensor 160 may include a full frame 35 mm format size charge-coupled device ("CCD") imager, a complementary metal-oxide-semiconductor ("CMOS"), charge injection device ("CID"), or other image sensing technology. In one embodiment, image sensor 160 may include a CCD imager, which employs row and column serial transfer circuitry, to take advantage of its inherently lower noise, higher dynamic range, pixel uniformity, shuttering capabilities, sensitivity to the near infrared spectrum, and relatively large imaging area. In another embodiment, image sensor 160 may include a CMOS imager, which employs individual pixel addressing, to take advantage of its region of interest windowing capabilities and speed of image transfer. In yet another embodiment, image sensor 160 may include a CID imager, which is similar to both the CCD and the CMOS in features and has the additional advantage of radiation hardness. The topologies of the CCD, CMOS and CID imagers are well understood by those skilled in the art of camera electronics as are the associated capture electronics 170 required by each.

Upon receiving light, image sensor 160 may be configured to transform the light into electrical signals. Image sensor 160 may be positioned along the optical path in between input window 110 and image capture electronics 170. In one embodiment, image sensor 160 may be configured to sense light in the UV spectrum, including UV radiation having a wavelength of about 254 nm. In another embodiment, image sensor 160 may be configured to sense light in the UV, visible, and infrared spectrums depending on the type of forensic evidence being captured by camera 40. Imagining sensor 160 may include a monochrome sensor to achieve higher resolution. Alternatively, in another embodiment, image sensor 160 may use a color filter. Image sensor 160 may be front illuminated or back illuminated. Using a front illuminated structure (not shown), image sensor 160 may include an on-chip lens, metal wiring, and a photodiode along an optical path. Alternatively, in another embodiment using the front illuminated structure (not shown), image sensor 160 may include an on-chip lens, transparent conductive wiring, such as Indium-Tin-Oxide, transparent gold, and other hybrid transparent conductive coating, and a photodiode along an optical path. Using a back illuminated structure (not shown), image sensor 160 may include an on-chip lens, a photodiode, and metal wiring along an optical path. Alternatively, in another embodiment using the back illuminated structure (not shown), image sensor 160 may include an on-chip lens, a photodiode, and transparent conductive wiring such as Indium-Tin-Oxide, transparent gold, and other hybrid conductive coating along an optical path. For either structure, the on-chip lens may be constructed from various grades of fused silica, including quartz, supracil, utrasil, optosil, or from calcium fluoride, magnesium fluoride, sapphire, plastics, or other suitable materials configured to pass light having a bandwidth of about 254 nm. Alternatively, the on-chip lens may not be included in image sensor 160.

Image capture electronics 170 may be configured to receive electrical signals from image sensor 160 and generate and direct UV images 50 to display 60 and storage 70. In one embodiment, image capture electronics 170 may be positioned along the optical path in between image sensor 160 and rear cover 180. Image capture electronics 170 may be configured to be compatible with the type of imager sensor 160, e.g., a CCD, CMOS, CID, or other image sensing technology. In one embodiment, image capture electronics 170 may transfer UV images 50 to display 60 or storage device 70 via USB, FireWire, IEEE 1394, Camera Link, GigE, or other wired interface. In another embodiment, image capture electronics 170 may transfer UV images 50 to display 60 or storage device 70 via Bluetooth, Wi-Fi, or other wireless interface. UV images 50 may be transferred in an interlaced, progressive, or other image format. The image data of UV images 50 may be 8 bit, 10 bit, 12 bit, 14 bit, 16 bit or other data format. In one embodiment, the image data of UV images 50 may be transferred as 8 or 16 bit monochrome format. Alternatively, in another embodiment, the image data of UV images 50 may be transferred as 24 or 32 bit color format. It is contemplated that the image data of UV images 50 may be transferred in RAW format (unmodified) or in modified format such as with gamma correction.

Rear cover 180 may be connectable to body 140 opposite input window 110. In one embodiment, rear cover 180 may be connectable to body 140 via one or more snap on connectors (not shown). However, it is contemplated that rear cover 180 may be connectable to body 140 via screws, slots, latches, or other connectors known in the art. In one embodiment, rear cover 180 may close off one side of box-shaped body 140 such that image sensor 160 and image capture electronics 170 are housed within body 140. In such an embodiment, rear cover 180 may be sized to match the dimensions of body 140. In one embodiment, rear cover 180 may be constructed out of plastic. However, rear cover 180 may be constructed from other materials used in modern cameras, such as, for example, wood, aluminum, steel, and titanium.

Figure 4:
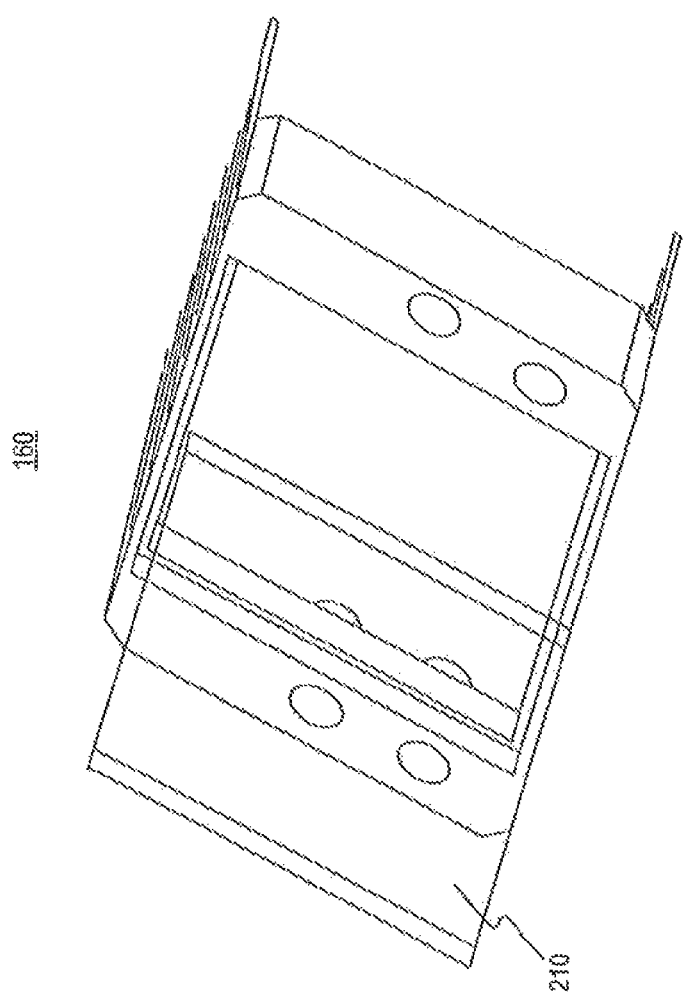
FIG. 4 is an assembly illustration of an exemplary disclosed imager having a partially removed coverplate that may be used in the UV sensitive video camera of FIG. 2.

As shown in FIG. 4, image sensor 160 may include an opening through its center that may be filled with a coverplate 210. Coverplate 210 may be configured to allow light to pass from input window 110 to image capture electronics 170. In one embodiment, coverplate 210 may be constructed from various grades of fused silica, including quartz, supracil, utrasil, optosil, and other trade names. In another embodiment, coverplate 210 may be constructed from calcium fluoride, magnesium fluoride, sapphire, plastics, or other suitable materials configured to pass light having a wavelength of about 254 nm. Alternatively, it is contemplated that image sensor 160 may not include coverplate 210. In yet another embodiment, image sensor 160 may be manufactured with coverplate 210 constructed from glass. In such an embodiment, coverplate 210 constructed from glass may be removed from image sensor 160.

Figure 5:
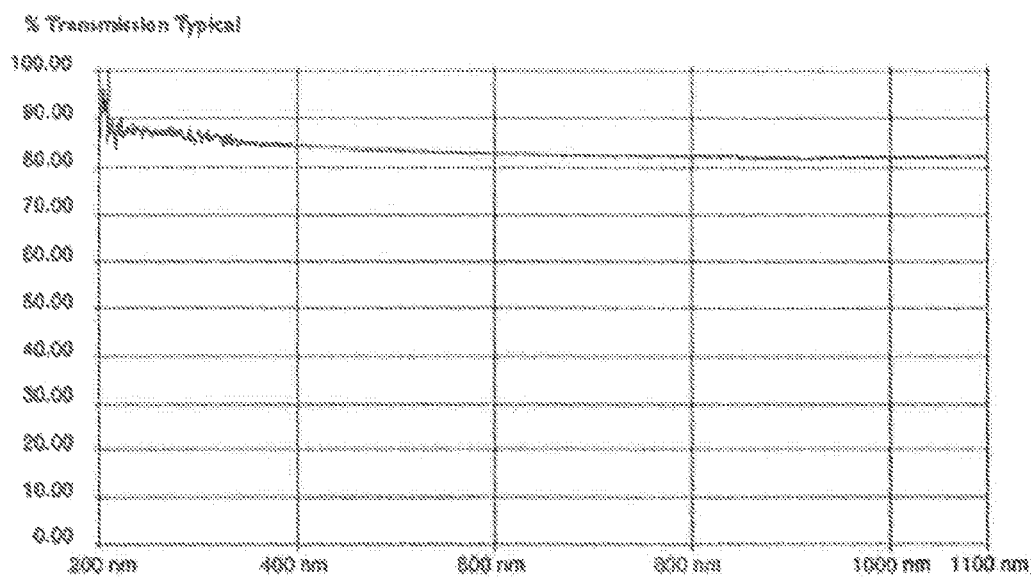
FIG. 5 is a graph showing the typical transmission percentage at varying wavelengths for an exemplary disclosed lens made from quartz.

FIG. 5 shows a transmission curve for a disclosed embodiment of lens 130 constructed from quartz. In this embodiment, lens 130 may be configured to transmit more than 80 percent of light having a wavelength between 200 nm and 1100 nm. For purposes of this disclosure, lens 130 may be configured to transmit high percentages of light at certain wavelengths, such as, for example, about 90 percent transmission at a wavelength of about 254 nm.

Figure 6:
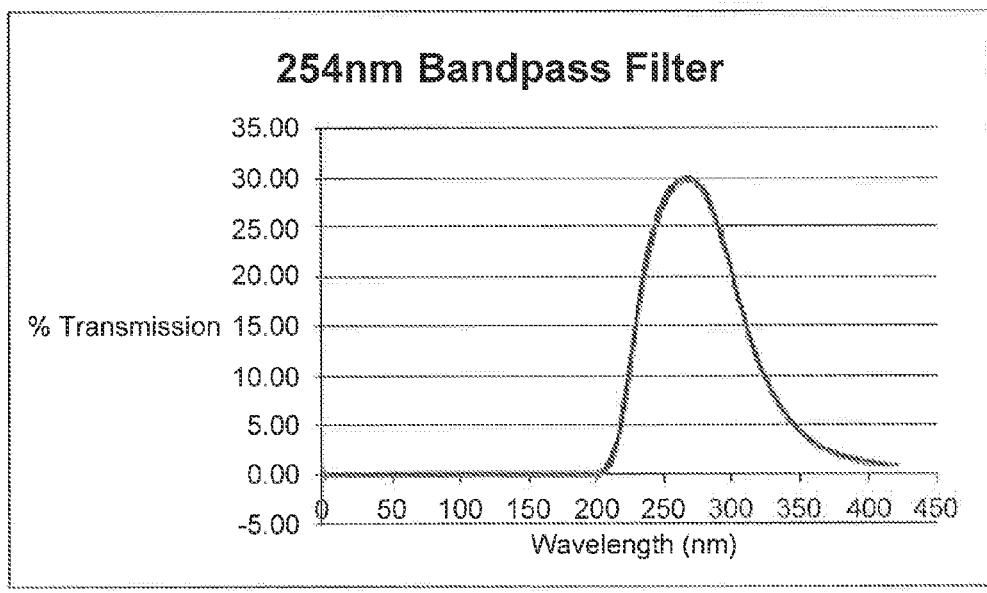
FIG. 6 is a graph showing the transmission percentage at varying wavelengths for an exemplary disclosed bandpass filter having a bandpass centered at about 254 nm.

FIG. 6 shows a transmission curve for a disclosed embodiment of bandpass filter 120. In this embodiment, bandpass filter 120 may be configured to transmit light having a wavelength between 200 nm and 450 nm and attenuate approximately all light outside of that band. For purposes of this disclosure, bandpass filter 120 may have a passband centered at about 254 nm and be configured to transmit about 30 percent of UV radiation having a wavelength at about 254 nm.

Figure 7:
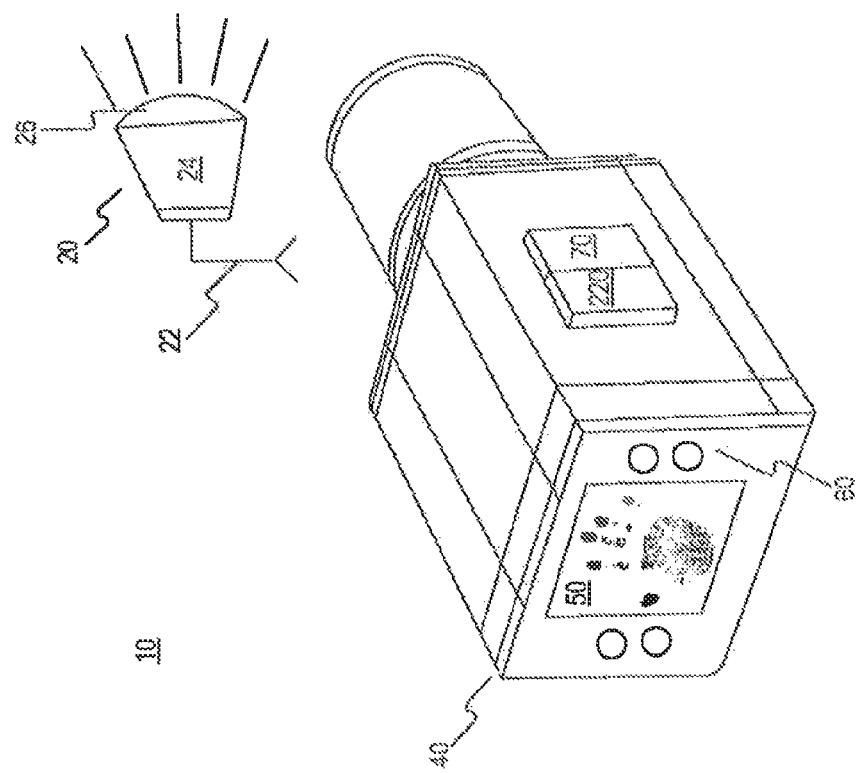
FIG. 7 is a diagrammatic illustration of an exemplary disclosed system for capturing UV images using a portable UV sensitive video camera.

FIG. 7 shows another embodiment of UV imaging system 10, which may be operated at a crime scene. In this embodiment, camera 40 may be pointed at subject 30 contained on nonporous surface 80. For purposes of this disclosure, subject 30 may include a handprint, including a collection of fingerprints and a palm print, and nonporous surface 80 may include a wall of a room in a building. In one embodiment, UV lamp 20 may be positioned to emit UV radiation at subject 30 at an angle roughly parallel to nonporous surface 80. Camera 40 may be positioned to capture UV images 50 of subject 30 at an angle between zero and 180 degrees with nonporous surface 80. It is contemplated that display 60 may be formed in rear cover 180 of camera 40. Camera 40 may house a mobile power source 220, which is configured to power camera 40. In one embodiment, mobile power source 220 may be a disposable alkaline battery. However, it is contemplated that mobile power source 220 may include a coin cell battery, lithium battery, rechargeable battery, or other mobile source of power known in the art. Camera 40 may house storage device 70 in the form of internal camera memory or removable memory.

INDUSTRIAL APPLICABILITY

The disclosed UV imaging system may be implemented into any imaging application that captures images in the UV spectrum, including industrial applications that require clean, grease-free surfaces. Those industrial applications may include ceramic circuit boards, LCD displays, image intensifier components, space born systems, and other contamination critical or vacuum out-gassing critical applications. The disclosed UV imaging system may offer improved accuracy and efficiency for investigators analyzing forensic evidence. Specifically, the disclosed UV imaging system may capture high resolution images in the UV spectrum as components along the optical path, i.e., input window 110, bandpass filter 120, lens 130, and image sensor 160, may be configured to pass light having a wavelength of about 254 nm. These high resolution images may be captured at a size greater than 2 inches by 2 inches at a resolution of at least 1000 pixels per square inch, thereby decreasing the risk of capturing a partial fingerprint or smudge and enabling the capture of an entire palm print or handprint. The disclosed UV imaging system may provide a live image of forensic evidence prior to developing and lifting the evidence, allowing an investigator to focus only on evidence that has forensic value. The disclosed UV imaging system may allow for this live image to be instantly captured and digitally saved. Operation of UV imaging system 10 will now be described.

Figure 8:
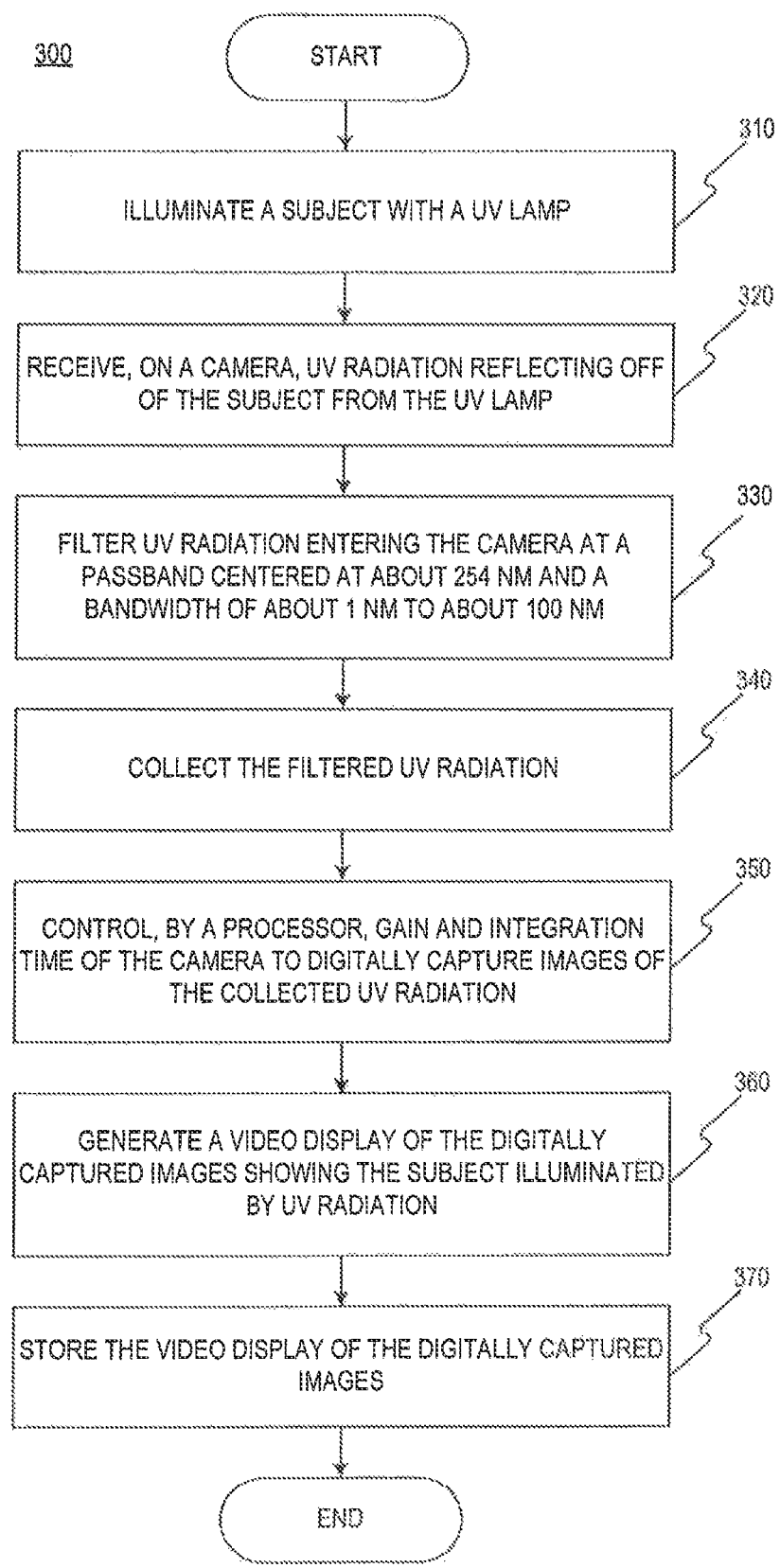
FIG. 8 is a flowchart of an exemplary disclosed method for capturing UV images on a camera that may be used with the system for capturing UV images of FIG. 1.

FIG. 8 shows a disclosed embodiment of a method for capturing UV images 50 on camera 40 using UV imaging system 10. In process 310, UV lamp 20 may illuminate subject 30 with UV radiation. In response, subject 30 may reflect the UV radiation or absorb the UV radiation and fluoresce. In one embodiment, UV lamp 20 may emit UV radiation onto subject 30 at a crime scene. In another embodiment, UV lamp 20 may emit UV radiation onto subject 30 in a lab. In either setting, UV lamp 20 may be fixedly positioned by a tripod or stand. Alternatively, UV lamp 20 may be positioned by an adjustable connecting arm (not shown) connectable to camera 40. In yet another embodiment, a user may hold UV lamp 20 in position. The angle at which UV lamp 20 emits UV radiation onto subject 30 may be adjustable to obtain a desired reflection or fluorescing off of subject 30. For instance, at a first angle light reflecting off of ridges in a fingerprint of subject 30 may appear white compared to a dark background. After adjusting UV lamp 20 to a second angle, light reflecting off of ridges in the fingerprint of subject 30 may appear black compared to a light background.

After UV lamp 20 illuminates subject 30, camera 40 may receive UV radiation reflecting off of subject 30 from UV lamp 20 as shown in process 320. In another embodiment, camera 40 may receive UV radiation fluorescing off of subject 30 from UV lamp 20. UV radiation may enter camera 40 through input window 110. Depending on the angle at which UV lamp 20 emits UV radiation on subject 30, as discussed above, the reflecting or fluorescing UV radiation may appear differently in camera 40 and UV lamp 20 may be adjusted to achieve a desired reflection. In another embodiment, UV lamp 20 may be maintained in a fixed position and angle and camera 40 may be adjustable to obtain a desired reflection or fluorescing off of subject 30.

In process 330, bandpass filter 120 may filter UV radiation entering camera 40 at a passband centered at about 254 nm and a bandwidth of about 1 nm to about 100 nm. In another embodiment, bandpass filter 120 may filter light centered at a different passband or bandwidth depending on the forensic evidence being captured. In one embodiment, bandpass filter 120 may filter UV radiation and then pass the filtered UV radiation to lens 130. In an alternative embodiment, light may enter lens 130, which may pass at least a portion of the light to bandpass filter 120. After passing through bandpass filter 120 and lens 130, filtered UV radiation may enter body 140 through input window 110. Input window 110 may pass at least a portion of the filtered UV radiation to image sensor 160 and other components housed inside body 140.

After being filtered and passing through input window 110, the filtered UV radiation may be collected by image sensor 160 as shown in process 340. In one embodiment, the filtered UV radiation may first pass through coverplate 210 of image sensor 160, which may pass at least a portion of the filtered UV radiation. Alternatively, image sensor 160 may omit coverplate 210. In one embodiment, the filtered UV radiation may pass through an on-chip lens of image sensor 160, which may pass at least a portion of the filtered UV radiation and direct the filtered UV radiation through metal wiring to a photodiode when image sensor 160 is front illuminated. In another embodiment, the filtered UV radiation may pass through an on-chip lens of image sensor 160, which may pass at least a portion of the filtered UV radiation and direct the filtered UV radiation through transparent conductive wiring, such as Indium-Tin-Oxide, transparent gold, and other hybrid transparent conductive coatings, to a photodiode when image sensor 160 is front illuminated. Alternatively, image sensor 160 may omit an on-chip lens. In another embodiment, image sensor 160 may be back illuminated such that the filtered UV radiation may pass directly to a photodiode before contacting metal wiring. Alternatively, the image sensor 160 may be back illuminated such that the filtered UV radiation may pass directly to a photodiode before contacting transparent conductive wiring, such as Indium-Tin-Oxide, transparent gold, and other hybrid transparent conductive coatings. It is contemplated that image sensor 160 may include a color filter along the optical path between the on-chip lens and metal wiring or photodiode that passes light of a particular color, such as, for example, red, green, or blue. It is also contemplated that image sensor 160 may include a color filter along the optical path between the on-chip lens and transparent conductive wiring, such as Indium-Tin-Oxide, transparent gold, and other hybrid transparent conductive coatings, or photodiode that passes light of a particular color, such as, for example, red, green, or blue.

As image sensor 160 collects the filtered UV radiation, at least one controller may control gain and integration time of camera 40 to digitally capture images of the collected UV radiation as shown in process 350. Camera 40 may include software instructions, executable by the at least one controller included in camera 40 or an affiliated computer, to adjust gain, gamma, pixel binning, frame rate, integration time, image readout, and image reset to capture high resolution UV images 50.

As shown in process 360, image sensor 160 and image capture electronics 170 may generate a video display of digitally captured UV images 50 showing subject 30 illuminated by UV radiation. In one embodiment, image sensor 160 may output a video display of at least two inches by two inches at a resolution of at least 1000 pixels per square inch. In another embodiment, image sensor 160 may output a video display that is four inches by four inches at a resolution of at least 1000 pixels per square inch. This four inch by four inch video display may be used to capture a palm print or entire handprint in addition to providing clearance to easily capture a fingerprint of subject 30. Image sensor 150 may have an output for a video display having a resolution of at least 16 megapixels. In one embodiment, the outputted video display may have a resolution of about 4900 by 3300 pixels. Alternatively, the outputted video display may have a resolution of about 4000 by 4000 pixels. It is contemplated that image sensor 160 may have, an output for a video display having a resolution of 5 megapixels, 8 megapixels, 11 megapixels, 20 megapixels, or 40 megapixels. At the direction of at least one controller, image capture electronics 170 may send the generated video display of UV images 50 to display 60 and storage device 70 via a wired connection, a wireless network, or other means of communication. Upon receiving the generated video display of UV images 50, display 60 may display UV images 50.

Interacting with software executed by one or more controllers in the camera or a computer configured to control display 60, a user may edit UV images 50 prior to storage on storage device 70. Alternatively, it is contemplated that software, executed by the at least one controller, may be configured to automatically edit UV images 50. For example, in one embodiment, software may enable gamma control to remap the video levels of the UV images 50 such that the intensity of very dim pixels are greatly increased, the intensity of brighter pixels are slightly increased, and the intensity of very bright pixels is not increased. In this embodiment, gamma control may be adjusted by a slider that allows a user to vary the gamma transfer function from 1:1 (i.e., no change) up to 1:0.3 (i.e., significant increase of brightness of dim pixel intensity). The gamma function is a well-defined function known to those skilled in the art of photography, cameras, and Photoshop.

In another embodiment, software may enable integration control to allow one or more frames of UV image 50 to be integrated, edited, and stored in memory. Before storing UV image 50, the one or more frames used to create UV image 50 may be edited to be summed, averaged, or superimposed. In the summed integration mode, one or more of UV images 50 are added together, thus creating an overall brighter image that becomes increasingly brighter as additional UV images 50 are added. To prevent all pixels from becoming saturated at full video brightness by allowing summed integration mode to continue indefinitely, a user may stop the summed integration mode when UV image 50 on display 60 reaches a desired intensity, at which point the summed UV image 50 may be saved to storage device 70. Alternatively, software may be configured to stop the summed integration mode when UV image 50 on display 60 reaches a predetermined level of intensity.

In averaged integration mode, one or more of UV images 50 may be added together and then divided by the number of images. When the light level is constant, the angle of illumination is constant, and the camera angle is constant, the averaged UV image 50 may remain the same intensity. A user may vary the brightness of UV lamp 20 or the angle of incidence until UV image 50 on display 60 becomes brighter or dimmer as desired, at which point the averaged integration mode may be stopped and UV image 50 may be saved to storage device 70. Alternatively, software may be configured to stop the averaged integration mode when UV image 50 on display 60 reaches a predetermined level of intensity.

In superimposed integration mode, one or more of UV images 50 may be superimposed on each previous UV image 50. In this mode, superimposed UV image 50 may be compared on a pixel by pixel basis with previous UV image 50, and if the intensity of any pixel of superimposed UV image 50 is greater than the corresponding pixel of previous IN image 50, the intensity of that pixel may replace the intensity of the corresponding pixel of previous UV image 50. Alternatively, if the intensity of the pixels of superimposed UV image 50 is less than the intensity of the corresponding pixels of previous UV image 50, the intensity of previous UV image 50 may be retained. A user may vary the position and angle of UV lamp 20 until UV image 50 on display 60 reaches a desired illumination and intensity, at which point the superimposed integration mode may be stopped and UV image 50 may be saved to storage device 70. Alternatively, software may be configured to stop the superimposed, integration mode when UV image 50 on display 60 reaches a predetermined level of illumination and intensity.

The video display of digitally captured UV images 50 may be stored on storage device 70. Storage device 70 may receive UV images 50 from camera 40 or display 60 via a wired connection, a wireless network, or other means of communication. Storage device 70 may store UV images 50 in file formats used for videos and photographs, such as, for example, TIFF, JPEG, GIF, MPEG, M4V, 3GP, and Quicktime. It is contemplated that storage device may store UV images 50 in any device for digitally storing UV images 50, such as, for example, internal computer memory, internal camera memory, a removable memory device, or a writable disc.

Many advantages may be associated with camera 40. In particular, by using materials configured to pass light having a wavelength of about 254 nm along its optical path, camera 40 may be capable of generating a video display having a resolution of at least 1000 pixels per square inch and dimensions of at least two inches by two inches. Using these large, high resolution images, investigators may be able to more accurately and efficiently detect, capture, and analyze forensic evidence. In addition, camera 40 may provide a real-time image of forensic evidence before any attempt is made to develop and lift fingerprints, decreasing time spent detecting, capturing, and analyzing forensic evidence.

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. An ultraviolet sensitive camera for capturing an ultraviolet reflectance image of a latent fingerprint on a subject comprising:
    a lens for receiving ultraviolet radiation reflected from the subject, wherein the lens is transmissive of at least about 90 percent of ultraviolet radiation having a wavelength of 254 nm;
    a bandpass filter for filtering the ultraviolet radiation reflected from the subject, the bandpass filter having a passband centered at about 254 nm and a bandwidth of about 1 nm to about 100 nm;
    a full frame 35 mm format size image sensor for collecting ultraviolet radiation passed through the lens and bandpass filter and for generating an ultraviolet image output based on the collected ultraviolet radiation, wherein the image sensor is configured to sense light in at least the ultraviolet spectrum and the visible spectrum, and pixels of the image sensor have at least one dimension of about 7.4 micrometers or more; and
    at least one controller configured to generate display signals representing the ultraviolet reflectance image of the latent fingerprint based on the ultraviolet image output of the image sensor.

2. The ultraviolet sensitive camera of claim 1, wherein the lens is positioned along an optical path between the bandpass filter and the image sensor.

3. The ultraviolet sensitive camera of claim 1, wherein the bandpass filter is positioned along an optical path between the lens and the image sensor.

4. The ultraviolet sensitive camera of claim 1, wherein the lens comprises quartz.

5. The ultraviolet sensitive camera of claim 1, further comprising an input window for passing ultraviolet radiation into a body of the camera, wherein the input window includes a coverplate constructed of material transmissive of at least a portion of radiation received having a wavelength of about 254 nm.

6. The ultraviolet sensitive camera of claim 1, wherein the bandpass filter has an out of band transmission of less than 0.1 percent.

7. The ultraviolet sensitive camera of claim 1, wherein the image sensor has a coverplate comprising a material configured to pass at least a portion of radiation received having a wavelength of about 254 nm.

8. The ultraviolet sensitive camera of claim 1, wherein the mage sensor includes a charge-coupled device including transparent conductive wiring.

9. The ultraviolet sensitive camera of claim 1, wherein the display signals generated by the at least one controller correspond to a display area having a resolution of about 4900 by 3300 pixels.

10. The ultraviolet sensitive camera of claim 9, further comprising a display for viewing the ultraviolet reflectance image of the latent fingerprint.

11. The ultraviolet sensitive camera of claim 1, further comprising a storage device configured to store data relating to the ultraviolet reflectance image of the latent fingerprint.

12. A system for capturing ultraviolet reflectance images of a latent fingerprint on a subject, the system comprising:
- an ultraviolet lamp for illuminating the subject, wherein the ultraviolet lamp has a power rating between 1 and 50 watts;
- an ultraviolet sensitive camera for capturing the ultraviolet reflectance images of the latent fingerprint, the camera comprising:
  - a lens for receiving ultraviolet radiation reflected from the subject, wherein the lens is transmissive of at least about 90 percent of radiation having a wavelength of 254 nm;
  - a bandpass filter for filtering the ultraviolet radiation reflected from the subject, the bandpass filter having a passband centered at about 254 nm and having a bandwidth of about 1 nm to about 100 nm;
  - a full frame 35 mm format size image sensor for collecting ultraviolet radiation passed through the lens and bandpass filter and for generating an ultraviolet image output based on the collected ultraviolet radiation, wherein the image sensor is configured to sense light in at least the ultraviolet spectrum and the visible spectrum, and pixels of the image sensor have at least one dimension of about 7.4 micrometers or more; and
  - at least one controller configured to generate display signals based on the ultraviolet image output of the image sensor;
- a display for viewing the ultraviolet reflectance images of the latent fingerprint based on the display signals generated by the at least one controller; and
- a storage device configured to store data relating to the ultraviolet reflectance images of the latent fingerprint.

13. A method for capturing ultraviolet reflectance images of a latent fingerprint on a subject using a camera, the method comprising:
- illuminating the subject with an ultraviolet lamp emitting radiation at least at a wavelength of about 254 nm and having a power rating between 1 and 50 watts;
- receiving, with the camera, ultraviolet radiation reflecting from the subject;
- filtering the ultraviolet radiation reflected from the subject with a filter having a passband centered at about 254 nm and a bandwidth of about 1 nm to about 100 nm;
- collecting, by a full frame 35 mm format size image sensor, the ultraviolet radiation passed through the filter, wherein the image sensor is configured to sense light in at least the ultraviolet spectrum and the visible spectrum, and pixels of the image sensor have at least one dimension of about 7.4 micrometers or more;
- controlling, by at least one controller, gain and integration time of the camera to digitally capture images of the latent fingerprint based on the collected ultraviolet radiation;
- generating a display of the digitally captured images of the latent fingerprint; and
- storing the digitally captured images of the latent fingerprint.

14. The method of claim 13, further comprising adjusting an angle at which the ultraviolet lamp illuminates the latent fingerprint such that the latent fingerprint appears darker than a background on the display.

15. The method of claim 13, further comprising adjusting an angle at which the ultraviolet lamp illuminates the latent fingerprint such that the latent fingerprint appears lighter than a background on the display.

16. The method of claim 13, wherein generating the display of the digitally captured images of the latent fingerprint further comprises generating a display having an area with a resolution of about 4900 by 3300 pixels.

17. The ultraviolet sensitive camera of claim 1, wherein the image sensor further includes an on-chip lens constructed of a material transmissive of at least a portion of radiation received having a wavelength of about 254 nm.

18. The system of claim 12, wherein the image sensor further includes a coverplate constructed of a material transmissive of at least a portion of radiation received having a wavelength of about 254 nm.

19. The system of claim 12, wherein the image sensor includes a charge-coupled device including transparent conductive wiring.

20. The method of claim 13, wherein the image sensor for collecting the ultraviolet radiation includes a coverplate constructed of a material transmissive of at least a portion of radiation received having a wavelength of about 254 nm.

* * * * *